United States Patent
Lennert et al.

(10) Patent No.: US 6,301,477 B1
(45) Date of Patent: *Oct. 9, 2001

(54) METHOD FOR CREATING AND MODIFYING SIMILAR AND DISSIMILAR DATABASES FOR USE IN GSM WIRELESS NETWORK CONFIGURATIONS FOR TELECOMMUNICATION SYSTEMS

(75) Inventors: Joseph Francis Lennert, Bolingbook; Rowena F. Mahaney; William T. Mahaney, both of Yorkville; Curt R. Zawiski, Naperville, all of IL (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,324

(22) Filed: Apr. 2, 1998

(51) Int. Cl.⁷ .............. H04Q 7/20; G06F 17/30
(52) U.S. Cl. .......... 455/433; 455/422; 455/462; 379/207; 707/104; 707/203
(58) Field of Search .................. 455/433, 434, 455/435, 422, 461–62, 466; 379/207, 221, 279; 707/4, 102, 103, 104, 203

(56) References Cited

U.S. PATENT DOCUMENTS

| | | |
|---|---|---|
| 5,274,802 | 12/1993 | Altine . |
| 5,434,798 | 7/1995 | Madebrink . |
| 5,561,854 * | 10/1996 | Antic et al. ............... 455/433 |
| 5,625,816 * | 4/1997 | Burdick et al. ........... 395/614 |
| 5,875,242 * | 2/1999 | Glaser et al. ............. 379/207 |
| 5,890,156 * | 3/1999 | Rekieta et al. ........... 707/10 |
| 5,901,352 * | 5/1999 | St-Pierre et al. ......... 455/426 |
| 5,920,820 * | 7/1999 | Qureshi et al. ........... 455/461 |
| 5,953,662 * | 9/1999 | Lindquist et al. ........ 455/433 |
| 6,003,026 * | 12/1999 | Bonzi ........................ 707/4 |
| 6,003,035 * | 12/1999 | Breame ..................... 707/102 |
| 6,026,291 * | 2/2000 | Carlsson et al. .......... 455/406 |
| 6,108,669 * | 8/2000 | Dalenberg et al. ....... 707/203 |

FOREIGN PATENT DOCUMENTS

WO 96 18146 A  6/1996 (WO) .

OTHER PUBLICATIONS

Eleftheriadis et al, XP 000606584, "User profile Identification in future Mobile Telecommunications Systems", IEEE Network, Sep./Oct. 1994.*

* cited by examiner

Primary Examiner—Vivian Chang
Assistant Examiner—Duc Nguyen

(57) ABSTRACT

This invention uses a computer program to mine preexisting wireless data located in a variety of preexisting source GSM wireless network databases. The computer program either creates a new wireless database from parts of existing wireless databases or modifies an existing wireless database. The computer program replaces the current system's reliance upon manual data entry by data engineers to configure the operation of a new telecommunication switch or replace the software in a telecommunication switch that was damaged or requires a new wireless network data configuration. This invention provides accurate and timely customer information, significantly decreases the time interval for engineering a new wireless database, decreases the research and data entry time, decreases the interval for lab planning and project management, improves wireless database integrity, provides a cleaner wireless database, reuses existing data eliminating double data entry, reuses some existing software code, and uses preexisting office data administration tools and provides a platform for future growth and expandability. By accomplishing these tasks, the telecommunication switch manufacturer or telecommunication switch operator saves time, money and decreases time-to-market product and service schedules.

36 Claims, 13 Drawing Sheets

METHOD FOR CREATING AND MODIFYING SIMILAR AND DISSIMILAR DATABASES FOR USE IN GSM WIRELESS NETWORK CONFIGURATIONS FOR TELECOMMUNICATION SYSTEMS

FIELD OF THE INVENTION

This invention relates to a computer program that can create new wireless databases from all or parts of one or more existing wireless databases containing data information for the operation of data and voice audio telecommunication switches.

DESCRIPTION OF THE PRIOR ART

The configuration of telecommunication switches usually occurs in at least three environments. First, during the testing of switch hardware and software, a laboratory switch is configured to the requirements established for the test. Second, when a switch is sold to a customer, the switch is configured to the customer's specifications. Third, when a switch experiences a full failure, it often requires reconfiguration of the databases supporting the failed switch or configuration of new databases for an emergency backup switch or replacement switch. Normally, the configuration of telecommunication switches during these three environments requires the manual input of thousands and possibly millions of records of information. This process is extremely time consuming and can take weeks or months to complete.

In the first environment, telecommunication companies continually test new versions of switch software, peripheral devices and other hardware devices during the life of a telecommunication switch. When testing software or hardware, switch engineers design different operating environments to establish operating parameters of the new software or hardware. Data engineers manually input data to configure the operation of the switch for the designed test. Usually, the configuration of the testing environment is performed on a data build machine (computer). The configuration of the switch to simulate the desired testing operational conditions often involves retesting archived configurations or modified archived configurations. Otherwise, the testing configuration is accomplished by manual data entry.

In the second environment, telecommunication switches sold to customers are configured based on the customer's intended operational conditions and equivalent. Usually, the configurations for new switches are manually built new data configurations without relying on existing database configurations. However, the configuration of the features, switching software and hardware is often adopted from other existing configurations.

The third operational environment is recovery of the switch after the switch has experienced a failure. These failures can result from equipment failure to natural disasters such as earthquakes, hurricanes or fires. Recovery of the failed switch sometimes requires the installation of an emergency backup switch. The emergency backup switch requires database configurations that replicate the databases in the damaged switch. Normally, the configuration of the emergency backup switch requires manual, time consuming input of data that will support specific customer features and routing of calls on the emergency backup switch. Having the ability to configure the telecommunication switch by transferring existing data information from known databases into new databases by automating the manual tasks of data entry would save considerable time, money and significantly improve productivity. In addition, instant access to many different switching systems is a critical task that currently requires many hours or days of research and manual browsing. A need exists for a robust process to automatically replace the current manual method data entry to configure wireless data for telecommunication switches.

SUMMARY

In order to automate the current manual data entry process of engineering GSM wireless configuration databases, the computer program of this invention establishes a new database structure and mines source databases to load source database wireless data into the new wireless database structure. The computer program is capable of searching for the desired data and automates many of the tasks for configuring a new wireless database from the source databases. This eliminates the requirement for manual data entry for configuring new wireless databases for telecommunication switches.

This computer program is multifunctional allowing for the browsing of all wireless databases prior to the configuration. Once the target source wireless databases are determined, the computer program creates a new data directory structure and selectively copies all or part of the data from the source wireless database into the new database. The user selects the "C" interfaces, and the mobile switching center subscriber services. The computer program builds the home location register. If the mobile switching center is included in the configuration, the user determines the "A" interface, the base station interface, the location areas, the geographical locations, the short message service, operations maintenance and billing center interfaces and the computer program builds the visitor location register, the equipment identity register, the dialed digit strings, the call routing, measurement and billing services. If the mobile switching center is not included in the configuration, the network configuration is run. The computer program builds the signaling connection control part and the destination database.

This invention provides accurate and timely customer information, significantly decreases the time interval for engineering a new wireless configuration database, decreases the research and data entry time, decreases the interval for lab planing and project management, improves database integrity, provides a cleaner wireless database, reuses existing wireless data eliminating double data entry, reuses some existing software code, can use preexisting tools, and provides a platform for future growth and expandability. By accomplishing these tasks, the wireless telecommunication switch manufacturer or wireless telecommunication switch operator saves time, money and decreases time-to-market product and service schedules.

DESCRIPTION OF THE DRAWINGS

The summary of the invention, as well as the following detailed description of preferred embodiments, is better understood when read in conjunction with the accompanying drawings, which are included by way of example, and not by way of limitation with regard to the claimed invention.

DESCRIPTION OF THE PREFERRED EMBODIMENT

The following applications are filed concurrently and are also incorporated by reference:
1. Method and Apparatus for Creating and Modifying Similar and Dissimilar Databases (U.S. Ser. No. 09/053,957).
2. Method for Creating and Modifying Similar and Dissimilar Databases for use in Dialing Plan Configurations for Telecommunication Systems (U.S. Ser. No. 09/054,094).
3. Method for Creating and Modifying Similar and Dissimilar Databases for use in Hardware Equipment Configurations for Telecommunication Systems (U.S. Ser. No. 09/054,207).
4. Method for Creating and Modifying Similar and Dissimilar Databases for use in Network Configurations for Telecommunication Systems (U.S. Ser. No. 09/053,961).
5. Method for Creating and Modifying Similar and Dissimilar Databases for use in Operator Services Configurations for Telecommunication Systems (U.S. Ser. No. 09/054,206).
6. Method for Creating and Modifying Similar and Dissimilar Databases for use in Private Branch Exchange Configurations for Telecommunication Systems (U.S. Ser. No. 09/054,193).
7. Method for Creating and Modifying Similar and Dissimilar Databases for use in Intelligent Network Configurations for Telecommunication Systems (U.S. Ser. No. 09/054,329).

Figure 1:
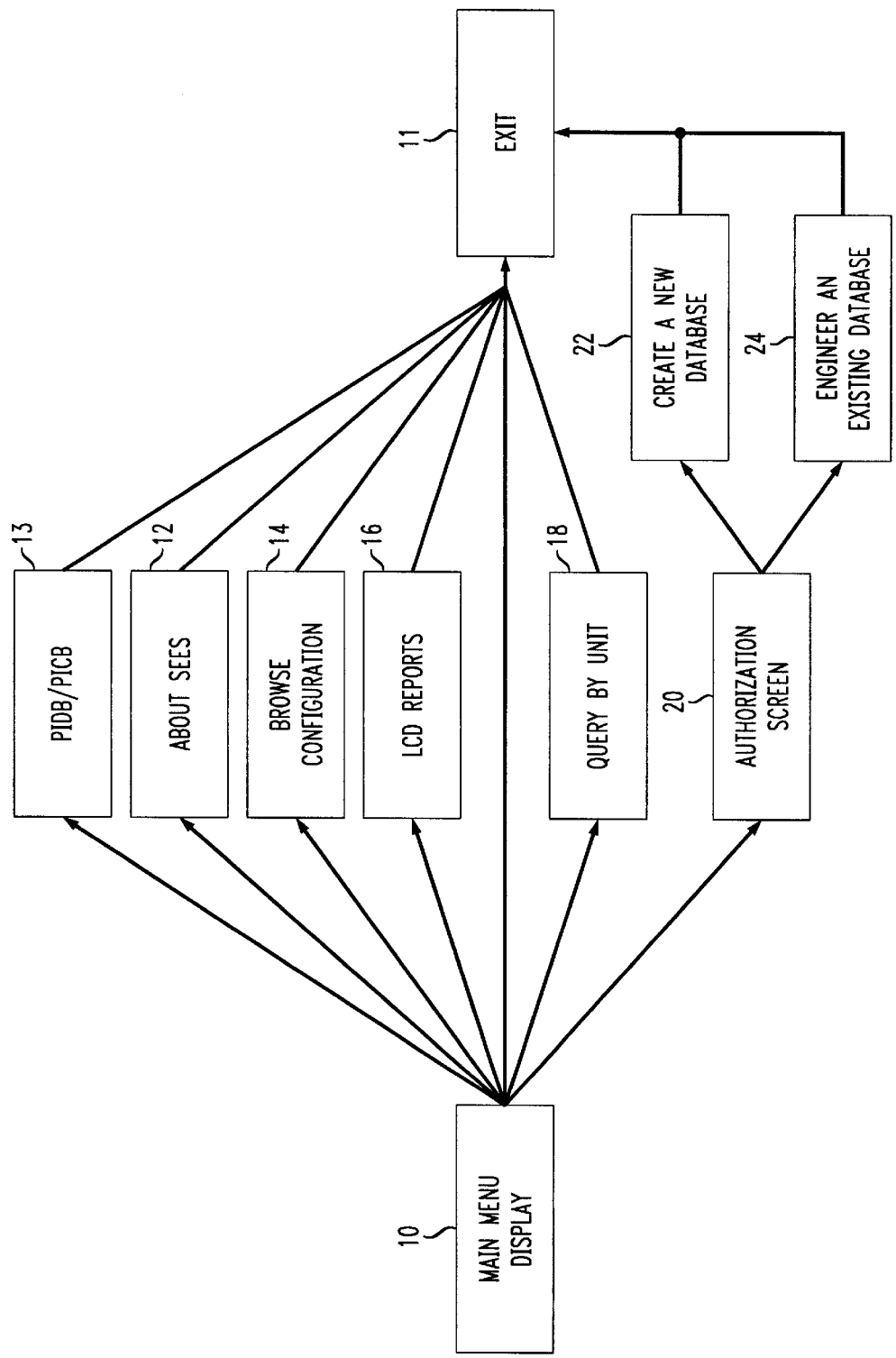
FIG. 1 is a functional flow chart illustrating the logical operations of the main menu of the computer program.

FIG. 1 illustrates the logical operation of the main menu of the user interface for the Simple Environment Engineering System ("SEES") computer program. If the SEES program is wrongly selected as the application of choice by the user, the main menu display 10 allows the user to exit 11 the computer program without choosing any of the functions. If SEES is selected as the program of choice by the user, from the main menu display 10, the user can select from one of seven operations.

These operations include: about SEES 12, peripheral interface data bus/peripheral interface control bus (PIDB/PICB) 13, browse feature 14, lab configuration document reports 16, query by unit 18, create a new database 22, or engineer an existing database 24. About SEES 12 is documentation about the computer program and the operations and features that a user can implement. Peripheral interface data bus (PIDB)/peripheral interface control bus (PICB) 13 allows a user to examine the peripheral units in the switching modules as they are connected to the interface control and data buses.

The browse feature 14 allows users to view the location and type of data in other databases. This feature allows the user to search for and find the desired data prior to generating new data from scratch. The lab configuration document reports 16 provide data on all the hardware for a given lab or for a customer's switch. Query by unit 18 identifies hardware items, features, signaling types, or other elements of the switch across many databases containing information on lab switches, manufacturers' switches, and/or customers' switches. Query by unit 18 also specifies and conforms targeting specific software releases to common versions.

The last two operations, create a new database and modify an existing database, have a guard dog or authorization screen 20 that prevents entry by unauthorized users into the program. Entry by unauthorized users beyond the browse feature impact existing source databases and source data resources. Allowing unauthorized users to create and modify existing source databases and source data resources can have severe effects on other operations due to the unintended destruction of valuable data. The computer program will query the user or the user's computer for authorization to gain access to those features of the program that allow for the creation or modification of wireless databases or data resources. Typical authorized users are data engineers. Once the screening process is complete, access is permitted, and another text or graphical user interface menu is displayed that allows the user to select features other than browse. From all six of these operations, a user can exit 11 the program.

The computer program uses all current data environments and employs functions to ensure that different versions of various software databases are converted to a common version. SEES provides accurate configuration information to customers on all environments to the switch module. SEES uses an office data administration tool called "unit-office" to insure a clean initial database structure. SEES automatically updates the newest office data administration tool issues and environments.

Figure 2:
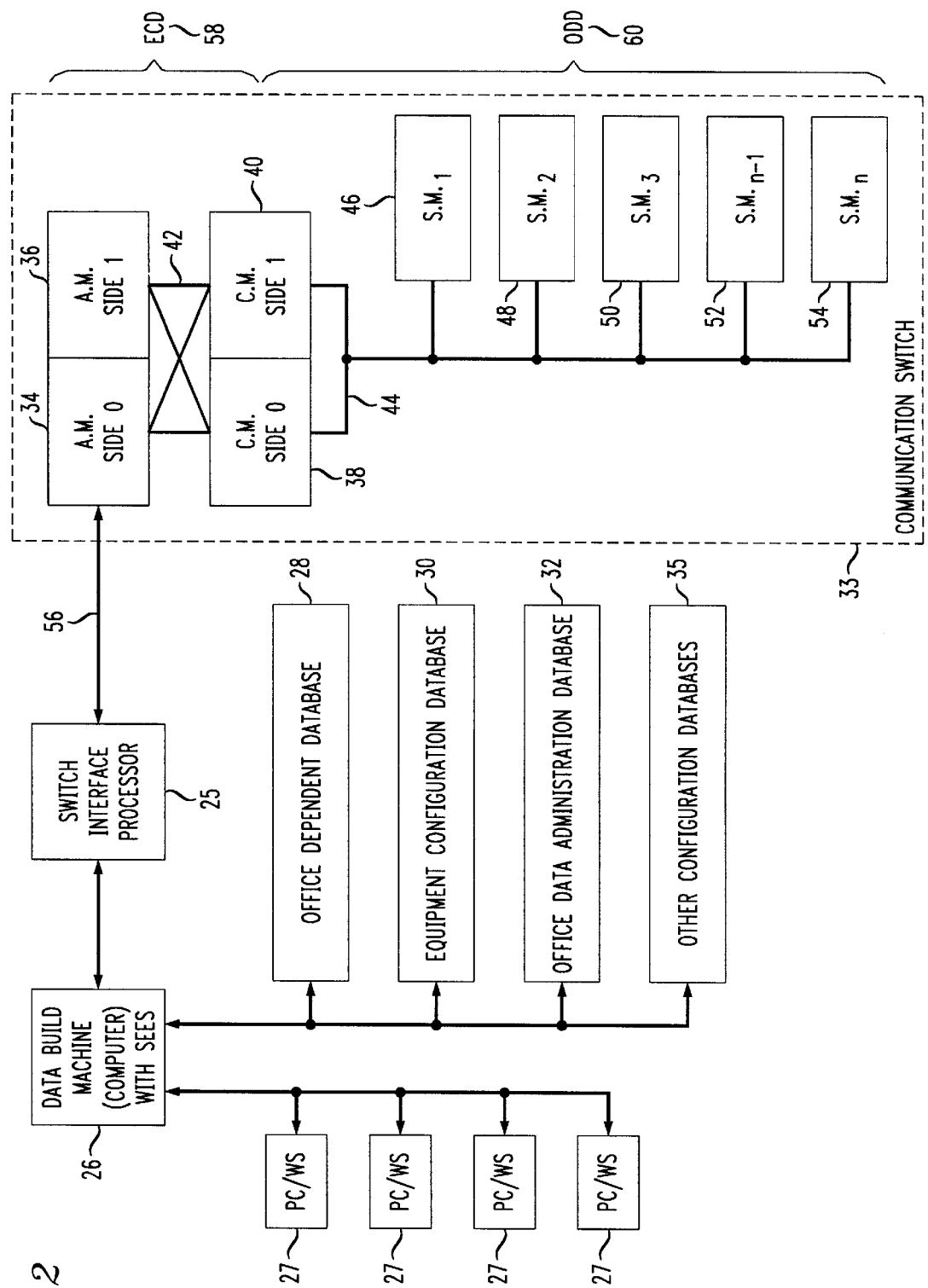
FIG. 2 illustrates the various hardware components and database types used in conjunction with the computer program.

FIG. 2 illustrates the various hardware components used in conjunction with a telecommunications switch 33. A data build machine 26 is used to create the data information used in the operation of a telecommunications switch 33. The data build machine 26 usually contains or has access to the source databases such as the office dependant database 28, the equipment configuration database 30, the office data administration tools 32, and other configuration databases 35. The SEES computer program located on the data build machine 26 relies on various tools or routines to help in the execution of its operation.

Also connected to the data build machine 26 are a variety of personal computers or work stations 27. The data build machine 26 is also connected to a switch interface processor 25. The switch interface processor 25 is capable of connecting to other data build machines or communication switches 33. The connection 56 between the switch interface processor 25 and other communication switches 33 or data build machines can be a physical link such as a communication line (fiber, coaxial cable, twisted pair, etc.) or a nonphysical link such as transferring tapes or disks containing the data. Other communication links include radio frequency (RF) links by satellite transmission of data or wireless transmission of data.

Many telecommunication switches 33 have redundant administration modules represented by a zero side 34 and a one side 36. The redundant administrative modules 34 and 36 operate such that one of the modules is in operation while the other is on standby. If the operating administrative module fails, the administrative module on standby starts operating without causing a loss of services. This is also true for the redundant communication modules which have a zero side 38 and a one side 40. The administration modules 34 and 36 and the communication modules 38 and 40 are crossed linked by communication links 42. The cross linking of administration modules 34 and 36 with communication modules 38 and 40 eliminates the interruption of service should one of these modules fail. Connected via communication link 44 to the communication modules 38 and 40 are switch modules 46, 48, 50, 52 and 54. Each telecommunication switch 33 has at least one switch module (SM). The Lucent Technologies' 5ESS Switch can currently support up to 192 switch modules connected to the administrative modules 34 and 36 and communication modules 38 and 40.

The equipment configuration database 30 contains information regarding the administration modules 34 and 36 and part of the communication modules 38 and 40 (encompassing items corresponding to bracket 58 in FIG. 2). The equipment configuration database 30 keeps track of all the equipment hardware associated with the telecommunication switch 33 including the various equipment types of the hardware such as tape units, circuit packs, administration module links and disks containing the software versions used in conjunction with the hardware and all associated resources.

The office dependent database 28 contains information regarding part of the communication modules 38 and 40 and the switch modules 46, 48, 50, 52 and 54 (encompassing items corresponding to bracket 60 in FIG. 2). The office dependent database 28 is loaded on the memory disk in the administration modules 34 and 36 and is pumped or downloaded into the switch module memory. The office dependent database 28 provides call set up, functional feature capability of the switch modules, and defines all switch module hardware configuration information.

Figure 3:
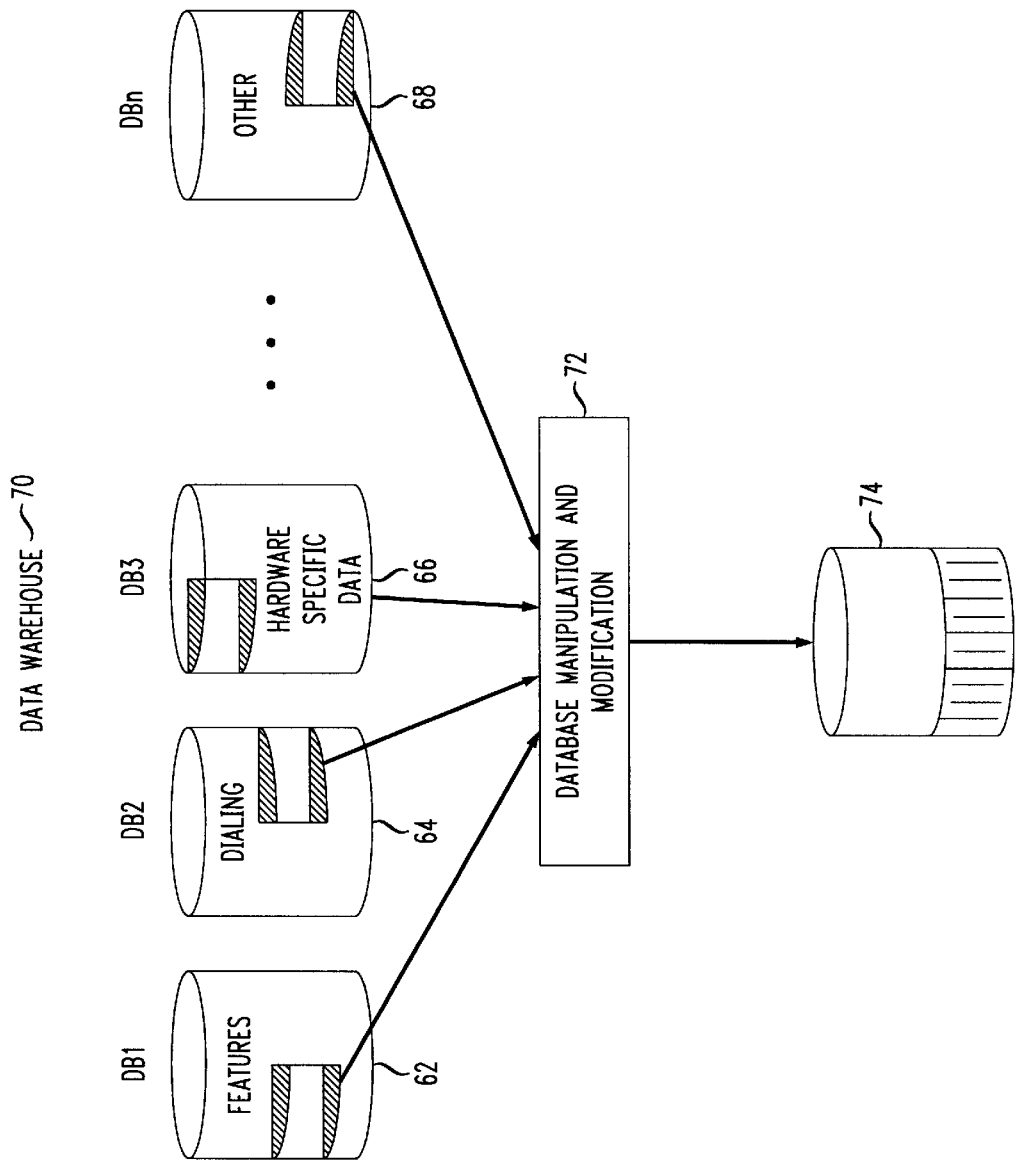
FIG. 3 illustrates the operation of the computer program as it builds a new database from parts of other databases.

FIG. 3 illustrates the operation of the Simple Environment Engineering System as it builds a new database from parts of other databases. In a typical setting, DB-1 62 contains information regarding features such as rate and routing information. DB-2 64 contains dialing information such as specific switch module configurations and networking rate and routing information. DB-3 66 contains hardware platform information such as additional switch module configurations. DB-n 68 are other databases in the data warehouse 70 containing information such as additional features or hardware. SEES identification routines browse the data warehouse 70 looking for desired components for reuse. In the database section modifier 72, SEES pulls new components from the various databases in the data warehouse 70 and with some modification such as altering the hardware designations for the software data, SEES creates a new database 74.

Figure 4:
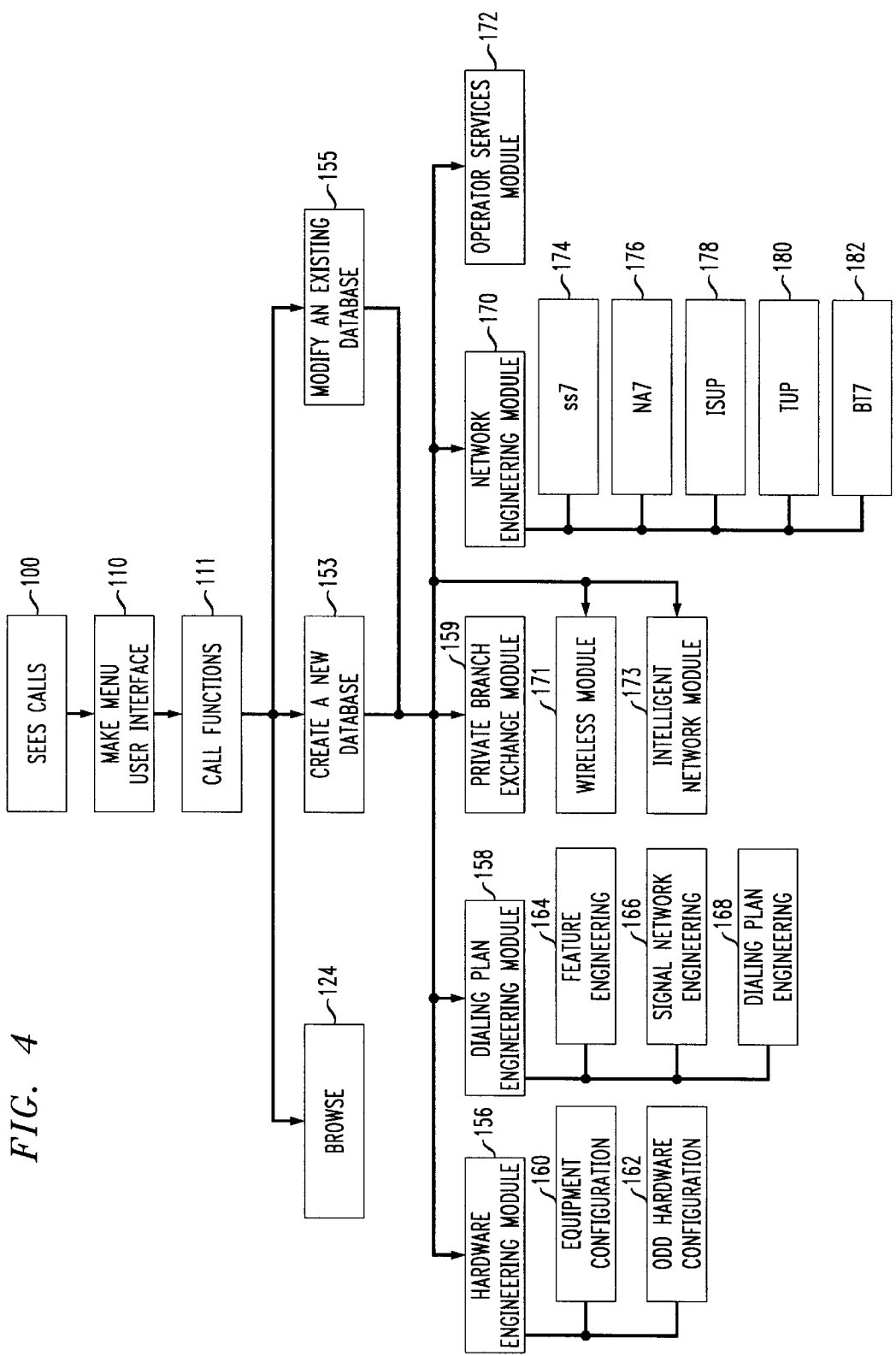
FIG. 4 is a flow chart of the overall features exercised in the operation of the computer program.

FIG. 4 illustrates the overall features of SEES. "SEES calls" 100 is a routine that calls other components of the program such as the make menu user interface (mkmenu) routine 110. The SEES' user interface allows a user to incorporate a variety of utilities including UNIX, web based languages, directories, databases, office data administration tools, DOS, and other applications. The make menu (mkmenu) routine 110 can be set up to use menu driven utilities employing streamlined commands, shortcuts, object menus, pictures or icons.

From the user interface screen 110, the user can call function 111 that implements the various configuration features of the computer program. The browse feature 124 restricts users to a read only environment but because of this restriction, allows many more unsophisticated users to use SEES to view the various databases used in the operation of a telecommunication switch 33. For more sophisticated users who have authorization to get past the guard dog 20, SEES queries as to whether a new database will be created 153 or whether an existing database will be modified 155. Either choice allows the user to select one of the seven configuration features of SEES.

The first feature of SEES is the hardware engineering module 156. This module includes the equipment configuration block 160 that allows users to examine the properties of the administrative modules 34 and 36 and the communication modules 38 and 40 used in the operation of a telecommunication switch 33. The office dependent database block 162 contains the data structures that control and describe the hardware and services for the various switching systems and contains information allowing the communication between the communication modules 38 and 40 and the switch modules 46, 48, 50, 52 and 54.

The second feature of SEES is the dialing plan engineering module 158. The dialing plan engineering module 158 includes the feature engineering block 164, the signal network engineering block 166 and the dialing plan engineering block 168. The feature engineering block 164 pulls existing features from other databases that contain feature definitions with embedded office dependant information into the new environment modified to the new database. The signal network engineering module 166 transfers data content regarding signaling information. The dialing plan engineering module 168 maps numbers that differentiate the route of the call and defines everything that is not hardware routing, trucking, lines, subscribers, and complete customer calling information.

The third feature of SEES is the network engineering module 170. The network engineering module 170 includes the signaling system 7 (ss7) block 174, the NA7 block 176, the ISDN user part (ISUP) block 178, the TUP block 180 and the British Telecom 7 (BT7) block 182. Other blocks can also be added that focus on the international standard of particular countries or particular telecommunication companies.

The fourth feature of SEES is the operator services feature 172. These services include but are not limited to directory assistance, automatic call distributor/distribution, toll and assistance applications, administrator measurements-operator, automated calling card services, automated operator trainer, automatic call distribution (ACD), busy line verification, and emergency alerts.

The fifth feature of SEES is the private branch exchange module 159. The private branch exchange module 159 is used to configure databases related to private branch exchange networks.

The sixth feature of the computer program is the intelligent network module 173. The intelligent network module 173 includes the dialing plan module 158, the hardware engineering module 156, and the network engineering module 170. These three components should be implemented prior to performing an intelligent network configuration.

The seventh feature of the computer program is the wireless module 171. The wireless module 171 includes the dialing plan module 158, the hardware engineering module 156, and the network engineering module 170. These three components should be implemented prior to performing a wireless configuration.

Figure 5:
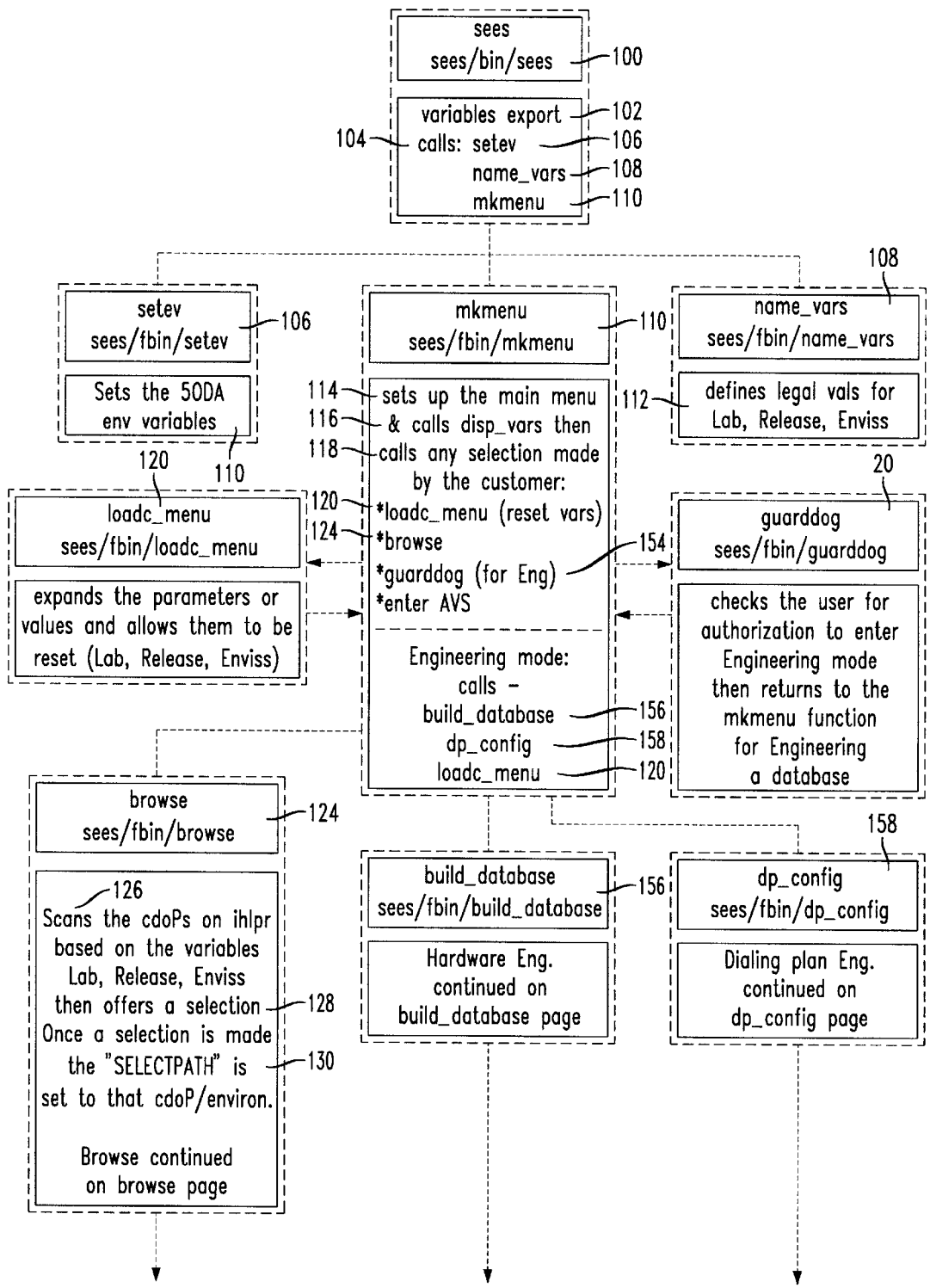
FIG. 5 is a flow chart of the logical operation of the computer program.

FIG. 5 is a flow chart of the logical operation of Simple Environment Engineering System. SEES 100 accesses variables 102 by calling the setev routine 106, the name variable (name_vars) routine 108 and the make menu (mkmenu) routine 110. The setev routine 106 sets the office data administration variables. The setev routine 106 also sets the office data administration environmental variables that provides a description of the functionality that setev routine 106 provides. The name variable (name_vars) routine 108 sets certain variable values. The name variables (name_vars) routine 108 defines legal values 112 for lab, release and enviss. Lab is the total testing environment that simulates the product being sold to the customer. Release is the hardware, software options (SWOPT), equipment configuration database and the office dependant database relating to the telecommunication switch 33 being used by SEES in the creation 153 or modification 155 of a database. The enviss routine is the environment tool version that the office data administration is supporting. The make menu (mmenu) routine 110 sets up the main menu 114 and calls a display variable (disp_vars) routine 116, then calls any selection made by the user.

From the make menu (mkmenu) routine 110, the user can access the load_menu routine 120 that expands the parameters or values and allows them to reset lab, release and enviss. The make menu (mkmenu) routine 110 also allows the user to access browse 124, and the create a new database 153 or build an existing database 155. To access either create a new database or build an existing database, the user must first pass a guard dog 20. The guard dog 20 functions as a screen permitting only authorized users into these sensitive areas of the data build machine 26 to either create 153 or modify 155 databases. The browse feature 124 allows users to view hardware and software configurations on known telecommunication switches 33.

Figure 6:
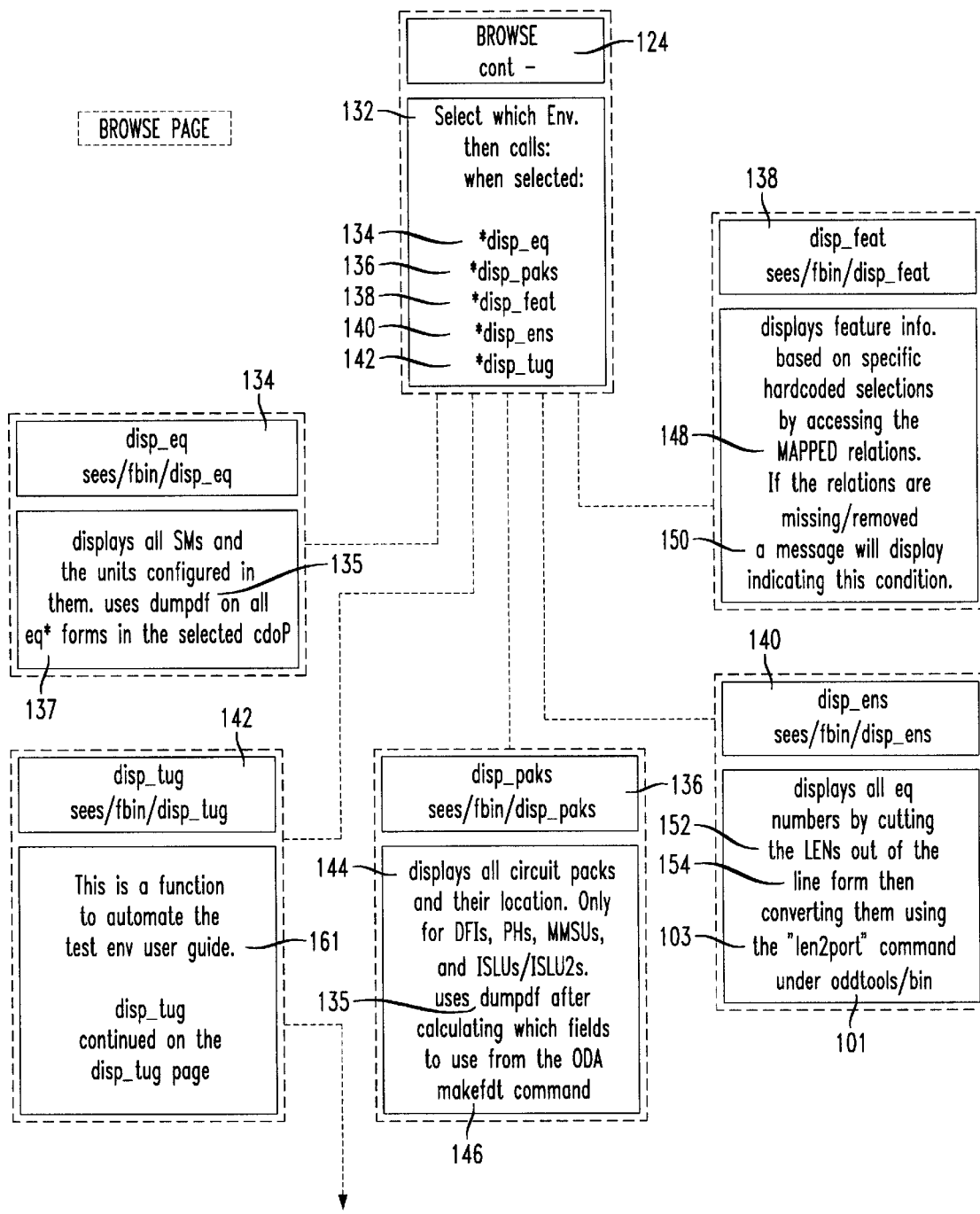
FIG. 6 is a flow chart of the browse feature of the computer program.

FIG. 6 illustrates the browse feature 124. The browse feature 124 allows the user to select the environment 132, then calls the display equipment (dis_eq) routine 134, the display packs (disp_paks) routine 136, the display features (disp_feat) routine 138, the display equipment number (disp_ens) routine 140 and the display the test user guide (disp_tug) routine 142. The display equipment (dis_eq) routine 134 displays all switch module and unit configuration within the switch module. The dumpdf routine 135 is used on all eq* forms (equipment related data) 137 in the selected circuit packs. The display packs (disp_pak) routine 136 displays all circuit packs 144 and their locations. The display packs (disp_paks) routine 136 uses dumpdf 135 after extracting the appropriate data to view from the office data administration makefdt command 146. The display feature (disp_feat) routine 138 displays the feature information based on specific hardcoded selections by accessing the mapped relations 148. If the mapped relations 148 are missing or removed, a message 150 will display indicating this condition. The display equipment number (disp_ens) routine 140 displays all equipment numbers by cutting the line equipment numbers 152 out of the data structures 154 and optionally, converts them using the len2port command 103 under oddtools/bin 101. The display test user guide (disp_tug) routine 142, an optional routine, automates the test environment user guide 161.

Figure 7:
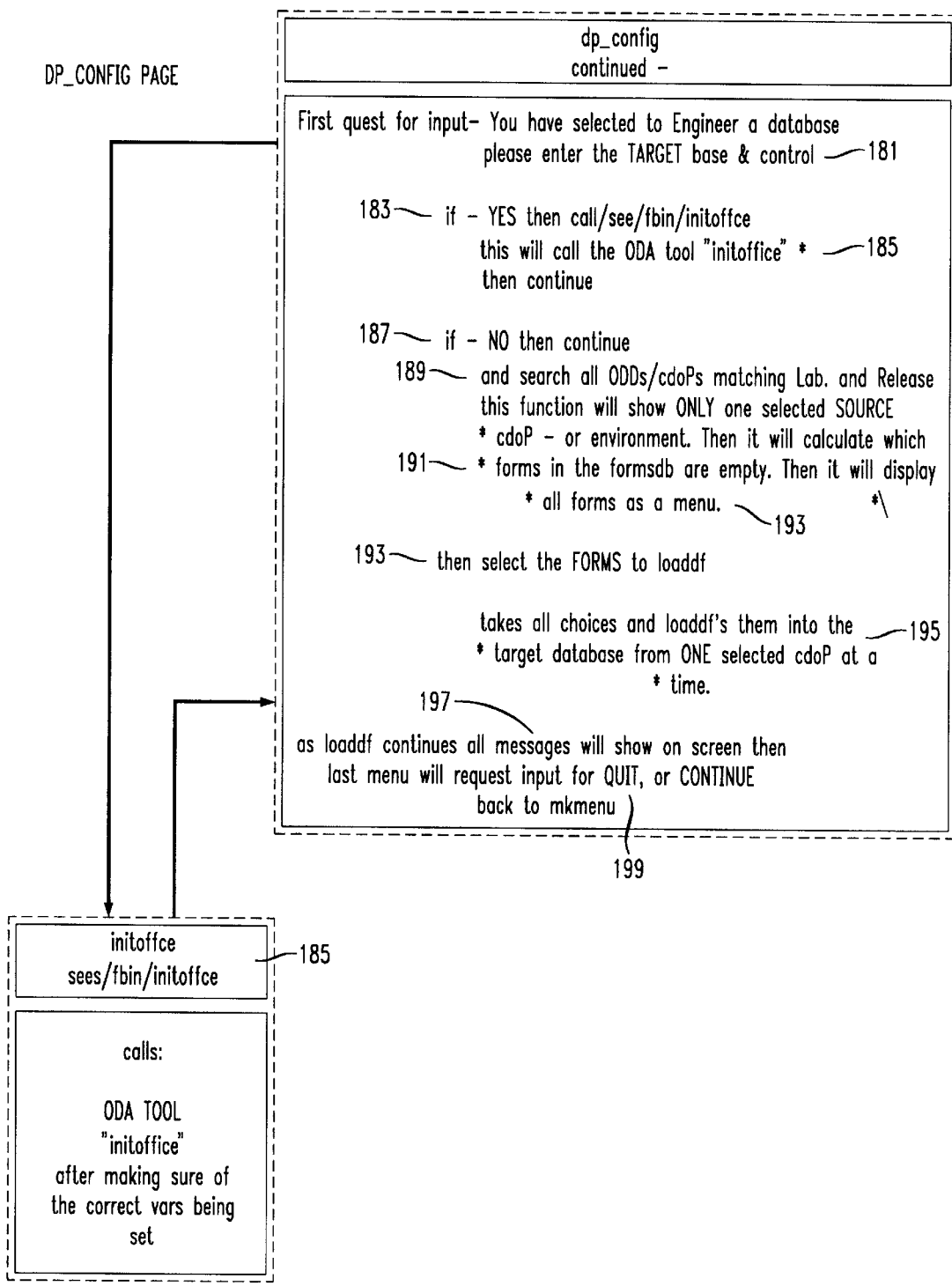
FIG. 7 is a flow chart of the dialing plan feature configuration of the computer program.

FIG. 7 illustrates the dialing plan configuration (dp_config) routine. The user is prompted for the target "base&control" 181. Base&control is the location where the new database is created and manipulated. If the user responds yes 183, then the computer program calls the office data administration tool init-office 185. Init-office 185 builds a database structure containing no data. Init-office 185 calls an office data administration tool that confirms that the correct version of vars 108 is running. If the user responds no 187, then the computer program searches 189 all of the office dependent databases. This function will show only one selected source environment. Then it will determine those data elements in the data elements database that are empty 191. It will then display all data elements as a menu. The computer program then selects the data elements to load 193 and takes all choices and loads them into the new database structure 195. As the load process continues, all messages 197 will show on the screen then the last menu will request input for ending the dialing plan configuration 199.

Figure 8:
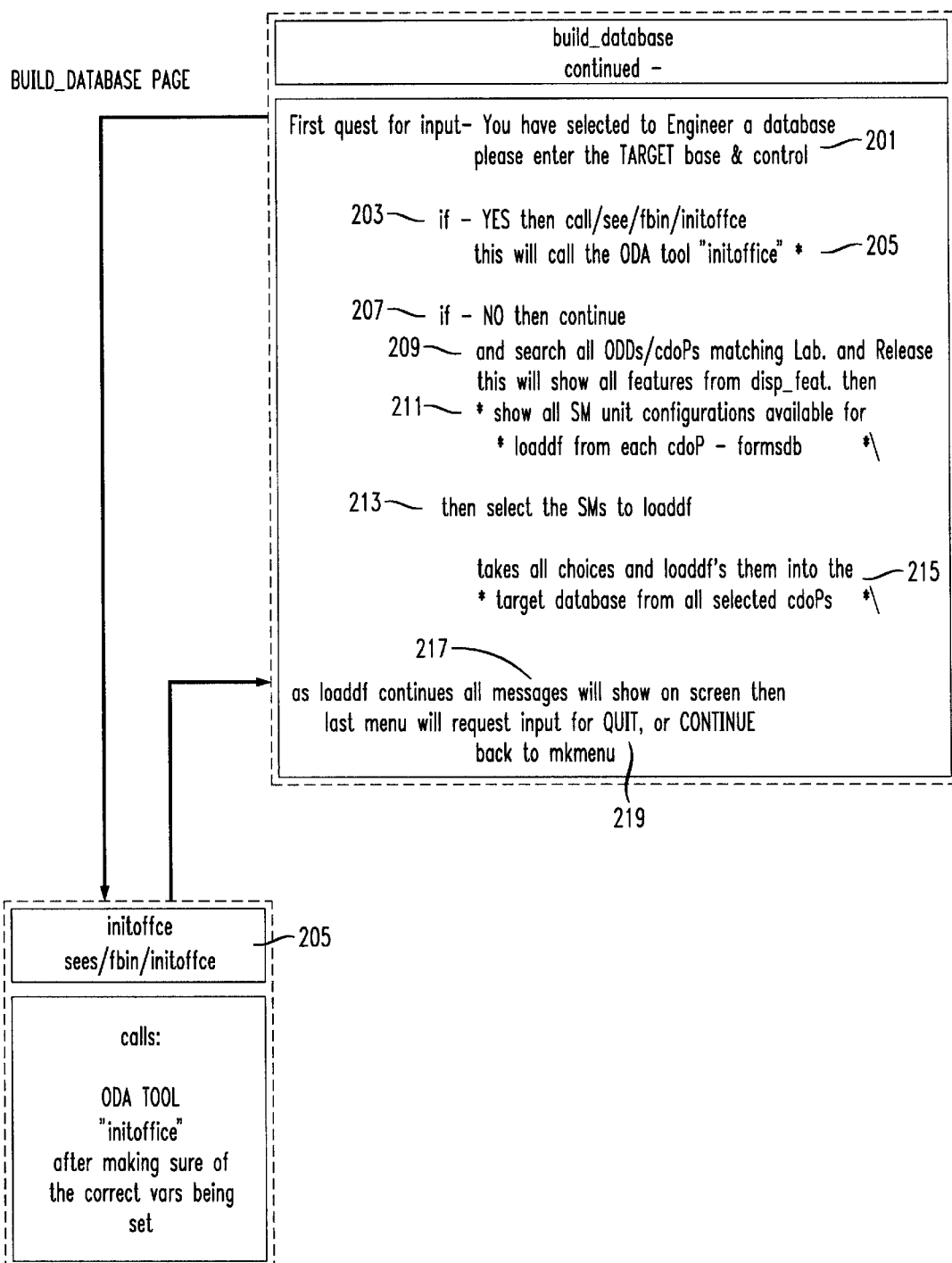
FIG. 8 is a flow chart of the build database feature configuration of the computer program.

FIG. 8 illustrates the build database feature. The user is prompted for the target "base&control" 201. From the response to the new location 203, the computer program calls the office data administration tool init-office 205. The init-office routine 205 builds a database structure containing no data. The init-office routine calls 205 an office data administration tool that confirms that the correct version of vars is running. If the user responds no 207, then the computer program searches 209 all of the office dependent databases. This function will show all features and display all switching module configurations available to load into the data elements 211. The program will then allow the user to select those switching modules to load in the new data structure 213. The program takes all the user selected choices and loads them into the new database structure 215. As the load process continues, all messages 217 will show on the screen then the last menu will request input for ending the dialing plan configuration 219.

Figure 9:
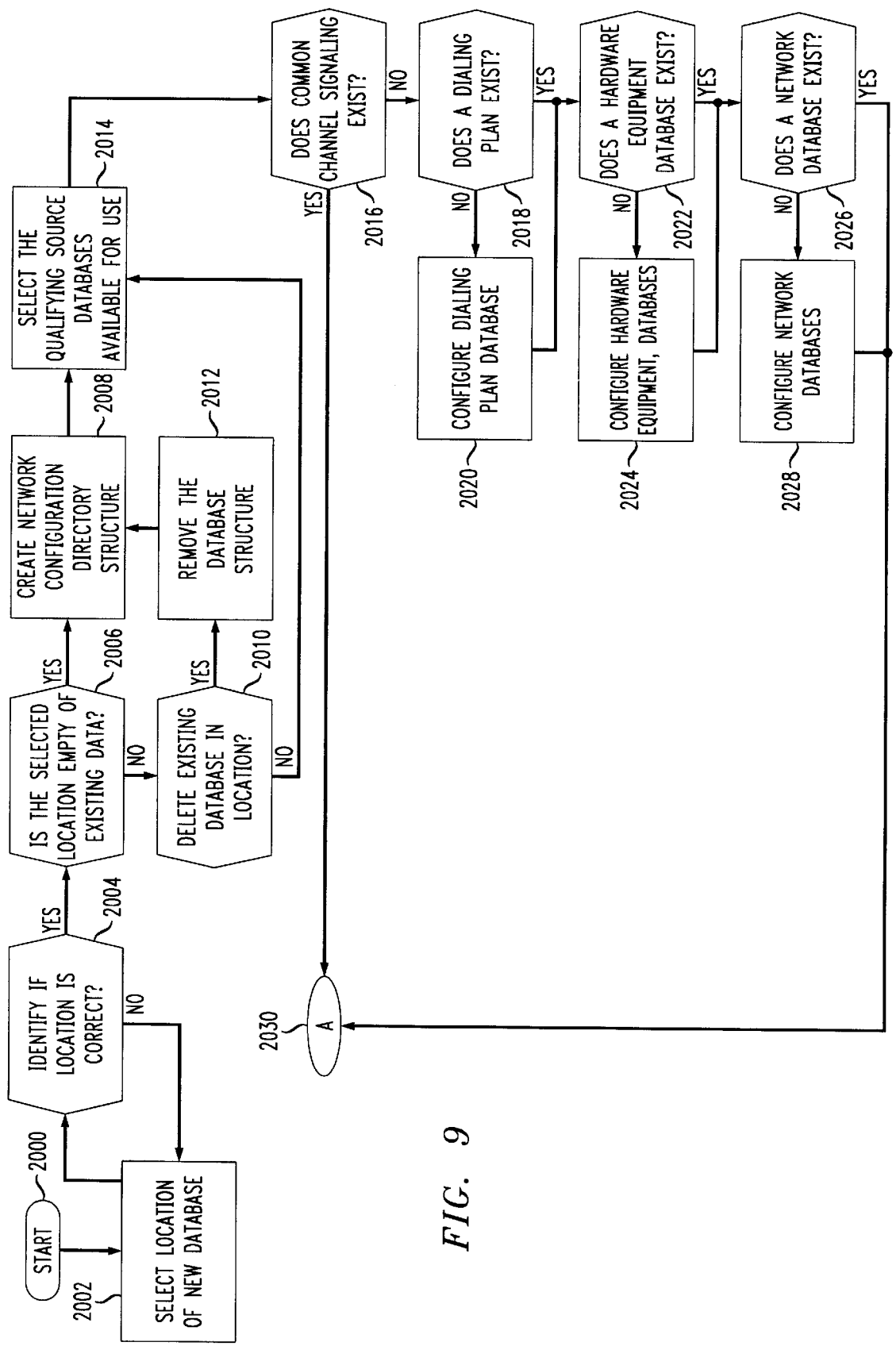
FIG. 9 is a flow chart of the GSM wireless configuration of the computer program.

FIGS. 9 through 12 illustrates flow charts for configuring a GSM wireless database. FIG. 9 illustrates the process of engineering the GSM wireless database or data resource from at least one source database or source data resource. The user calls and starts 2000 the computer program. The computer program can be located on one machine (a computer device) or multiple machines virtually connected via a network file share capability allowing all the virtual machines to appear as one machine and containing all existing source databases or source data resources. In the main menu of the computer program, a text or graphical user interface presents the main menu to the user allowing the user to select whether to browse existing source databases and source data resources or whether the user desires to create a new source database or engineer (modify) an existing source database from all or parts of other existing source databases or source data resources.

When the user selects the GSM wireless engineering feature, the user is required to select the location of the new GSM wireless engineering database 2002. Selecting means selecting an item from a menu or imputing information such that the computer can react to the instruction. In addition, the user must select whether the new or modified hardware equipment database should be located on the same machine (computer) or a virtual machine (computer), should the GSM wireless database be created or modified, and whether the GSM wireless database should be inclusively updated. The location of the new database 2002 is confirmed 2004 with the user and if the confirmation is not correct, the computer program allows the user to reselect a different location 2002.

The computer program searches or checks the node or location where the user intends for the new or modified GSM wireless database to be located. This node check will confirm the actual location of the GSM wireless database, and whether the node is free 2006 on the desired machine (computer). The computer program confirms whether the selected location of the new database is empty of existing data 2006. If the response from the user is yes, the computer program creates a new GSM wireless directory structure 2008. If the response is no, the program allows the user to delete the existing database 2010. If the database is deleted, the program removes the database structure 2012 and creates a new GSM wireless directory structure 2008. The GSM wireless directory structure can be created to hold similar and dissimilar size data as compared to the source databases.

If the existing database structure is not deleted, or the program created a new GSM wireless directory structure, the computer program then allows the user to select the qualifying source databases available for use 2014. The source databases might have access utilities to assist in the configuration of a new database. The computer program then selects qualifying existing source data resources using the user set criteria input when the user was prompted to select the lab, machine (computer), site, customer name, and software release. The computer program requires the user to select and input certain elements regarding the characteristics desired in the new GSM wireless database to be created in order to search existing source databases and source data resources for existing data. For example, the user will be prompted to select the lab, the computer or machine, the site location of the new or modified GSM wireless database, the customer name, the software release, and the version of the source database or source data resource.

The computer program queries whether common channel signaling exists 2016. If it does not, a series of queries establishes those features that need configuration. If a dialing plan needs configuring 2018, a dialing plan is configured 2020. If a hardware equipment configuration is required 2022, a hardware equipment configuration is configured 2024. If a network configuration is required 2026, a network configuration is configured 2028. If common channel signaling exists 2016 or if the dialing plan, GSM wireless and network configurations are completed, then connector "A" 2030 links FIG. 9 and FIG. 10.

Figure 10:
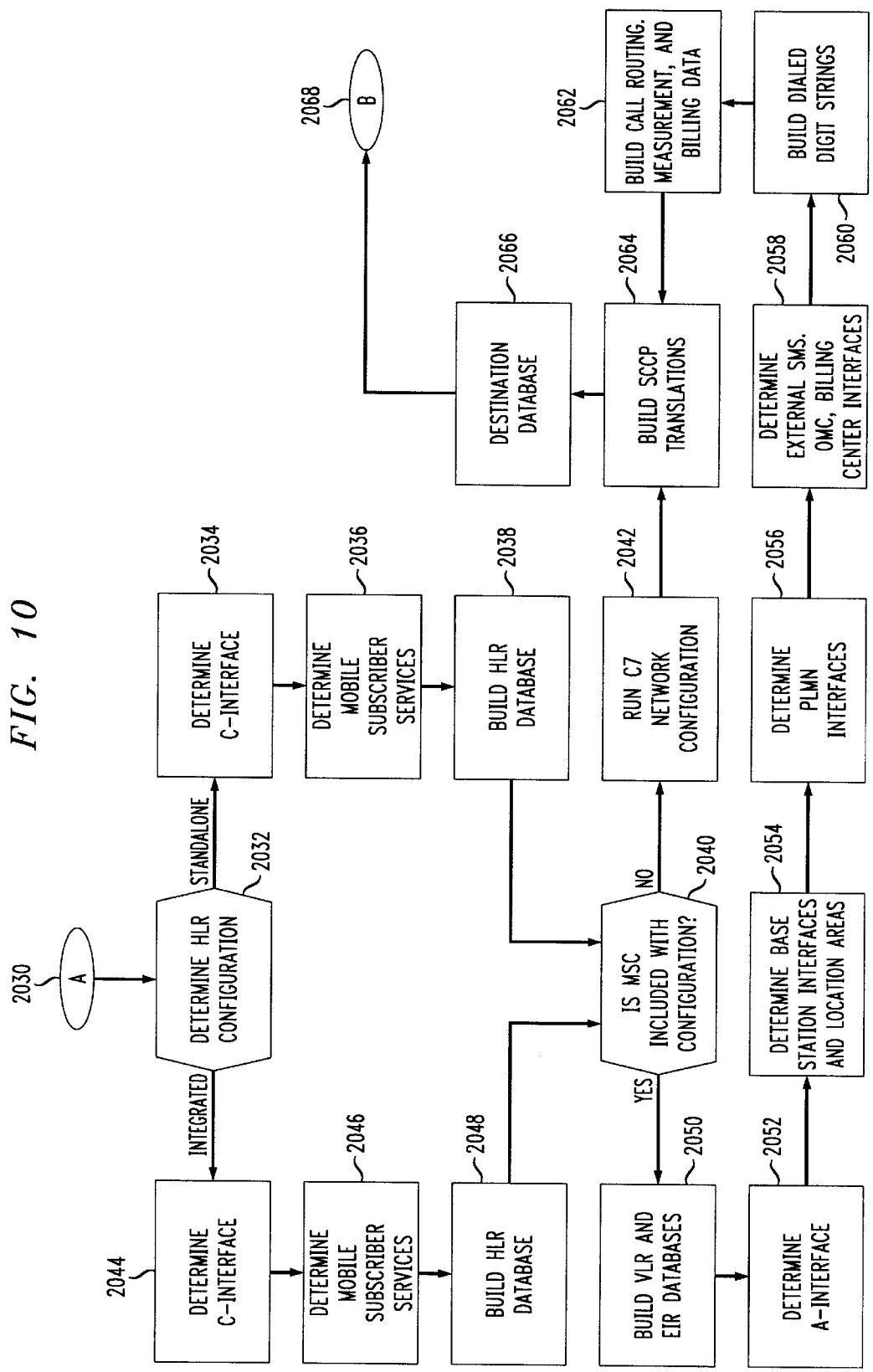
FIG. 10 is a flow chart of the GSM wireless configuration of the computer program.
Figure 11:
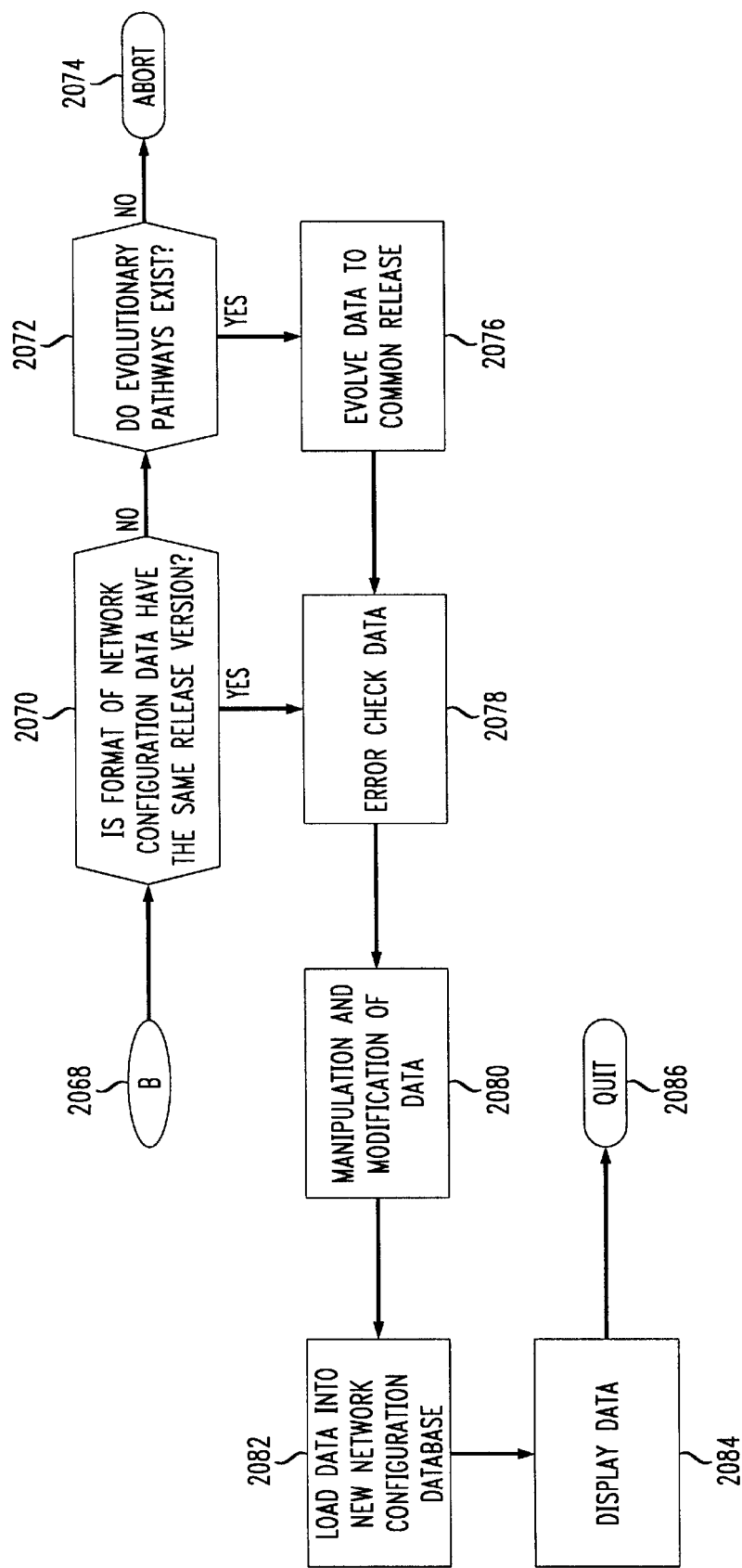
FIG. 11 is a flow chart of the GSM wireless con-figuration of the computer program.

In FIG. 10 the program queries the user as to whether the new GSM wireless database will have an integrated or stand alone home location register (HLR) configuration 2032. If the HLR is a stand alone configuration, the user must determine the "C" interface 2034 that separates the mobile switching center and the HLR and is well known in the GSM standard. The user must also determine the mobile subscriber services 2036 such as the subscriber identity confidentiality, the subscriber identity authentication, the signaling information element, the voice encoding confidentiality and the subscriber equipment confidentiality. The program then builds the HLR database 2038 that contains the characteristics of the subscribers. If the MSC is not included in the configuration 2040, the program will configure a network 2042 according to FIGS. 12 and 13.

If the user selects an integrated HLR configuration 2032, the user must determine the "C" interface 2044 that separates the mobile switching center and the HLR and is well known in the GSM standard. The user must also determine the mobile subscriber services 2046 such as the subscriber identity confidentiality, the subscriber identity authentication, the signaling information element, the voice encoding confidentiality and the subscriber equipment confidentiality. Other services include the subscriber location services for the initial registration and the location update registration. The program then builds the HLR database 2048 that contains the characteristics of the subscribers. If the MSC is included in the configuration 2040, the program will build visitor location registers (VLR) and equipment identity registers (EIR) databases 2050.

The user determines the "A" interface that is the interface 2052 between the mobile switching station (MSC) and the base station and is known in the GSM standard. The user also determines the base station interfaces and location areas (geographical locations) 2054, and the public land mobile network (PLMN) interfaces that allow the mobile switching center to interface with the public switched telephone network (PSTN) and other mobile switching centers (MSCs) 2056.

The user must also determine the external short message service (SMS), operations and maintenance center (OMC), and billing center interfaces 2058. The computer program builds the dialed digit strings for the digit analysis 2060 and builds the call routing, measurement and billing data 2062.

The computer program builds the signaling connection control part (SCCP) 2064 after the call routing, measurement and billing data 2062 is built from the integrated HLR configuration and after the network configuration is run 2042. Then the computer program builds the destination database 2066. Connector "B" links FIG. 10 with FIG. 11.

The program determines if this format is the same version or release as the new database structure 2070. This is accomplished by matching the selected criteria in the software release with the new or existing software release of the directory structure and name. If the format is not the same, the computer program determines if evolutionary pathways exist 2072. If the evolutionary pathways do not exist, the computer program aborts 2074. If the evolutionary pathways exist 2074, the program calls an evolution tool 2076, to modify the saved data so that consistency with the new location is maintained.

If the format is the same version or release as the new database structure 2070, or after the evolution of data has occurred 2076, the data is error checked 2078. The program dynamically manipulates and modifies the data 2080. All selected GSM wireless plan data that is saved is loaded 2082 or merged into a new or existing GSM wireless data resource using a platform utility that converts the data from an ASCII format to a binary format and loads the data into the database. The computer program displays 2084 all the statistics on the data elements as they are being loaded into the selected location. In addition, the computer program displays errors, updates, and non-updates to the selected location data resource. The computer program then allows the user to return to the main menu or quit, (exit the program) 2086.

Figure 12:
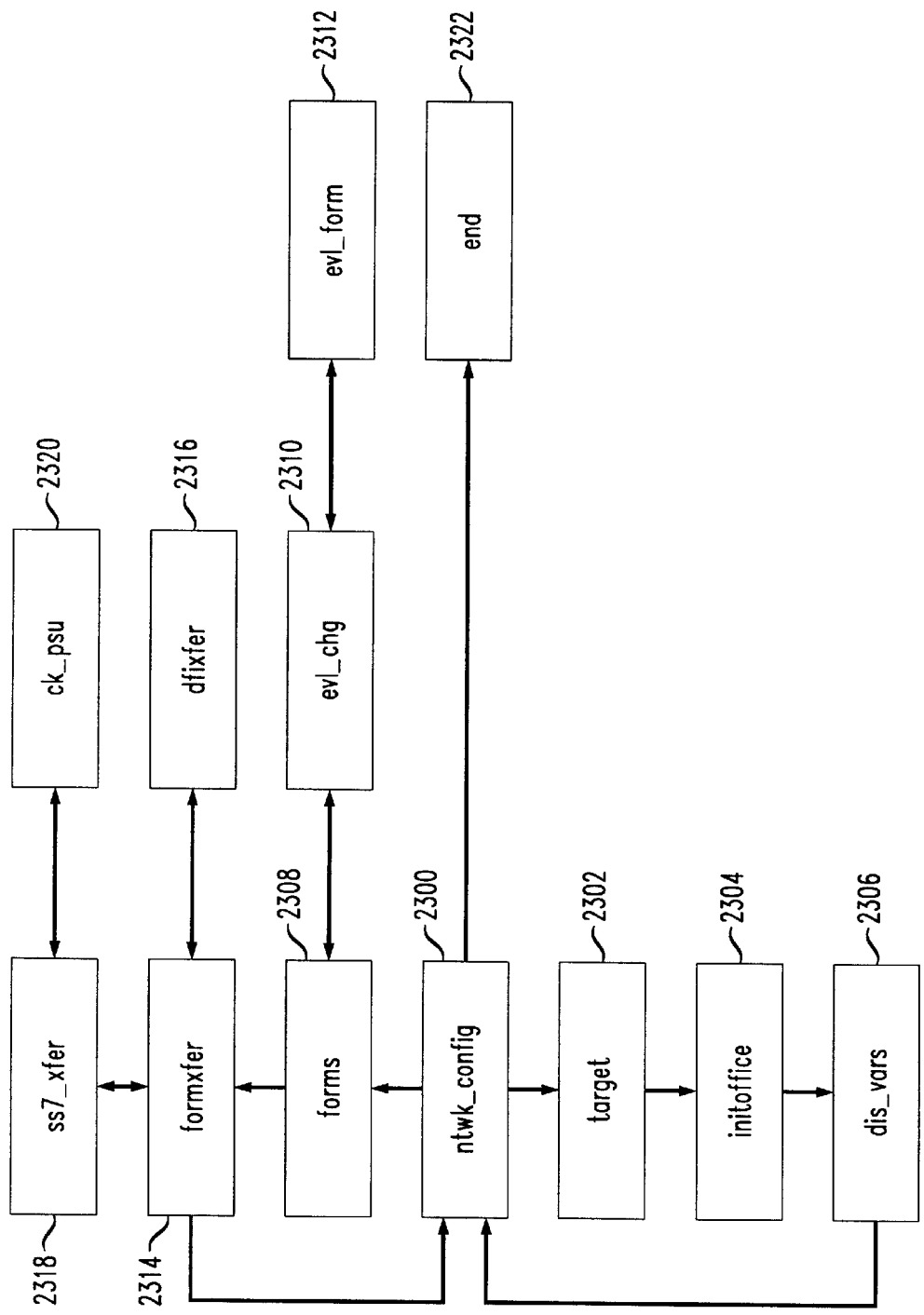
FIG. 12 is a flow chart of the network configuration of the computer program.
Figure 13:
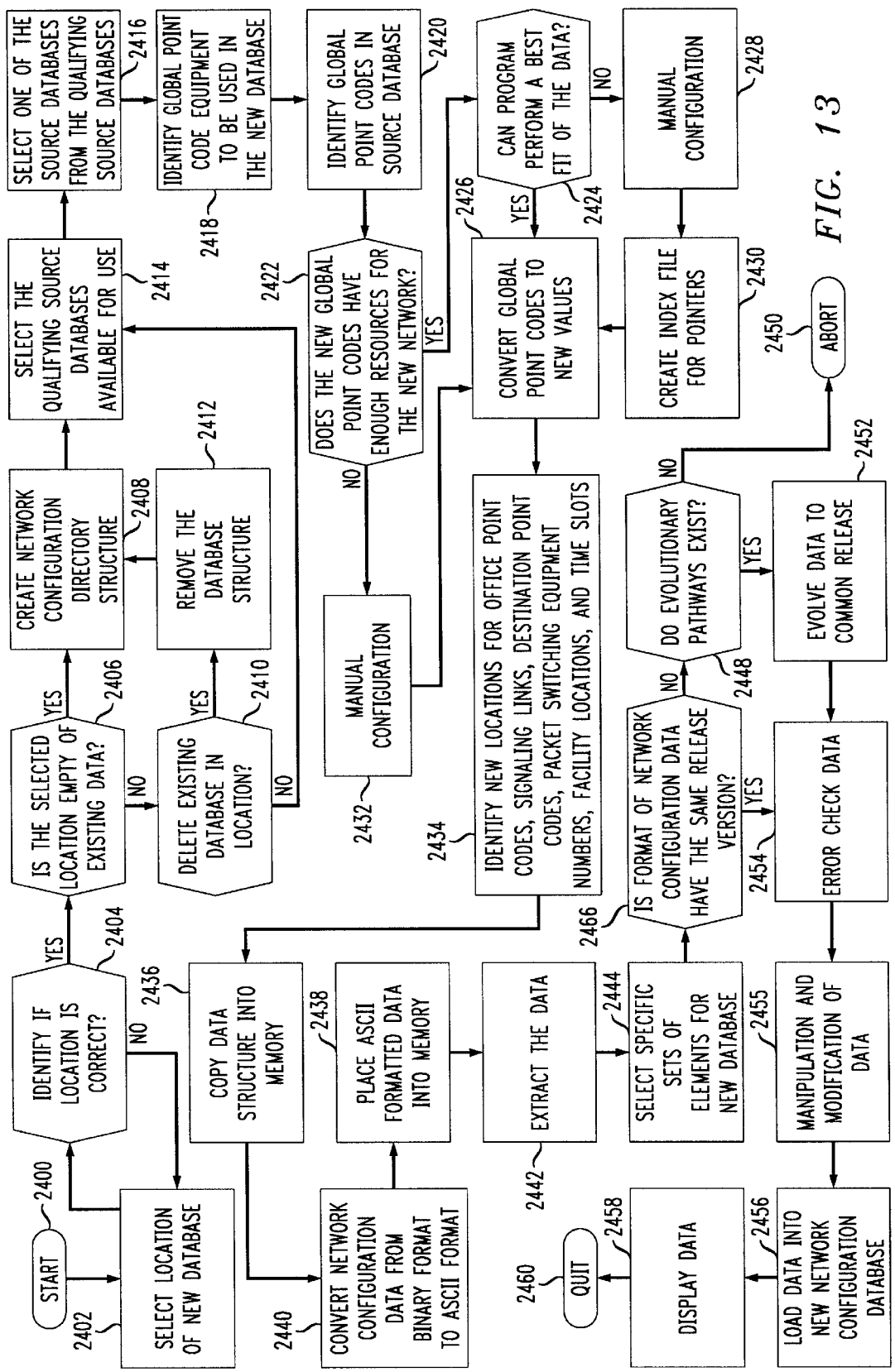
FIG. 13 is a flow chart of the network configuration of the computer program.

FIGS. 12 and 13 illustrate the network configuration if required in block 2042. FIG. 12 illustrates the netwk_config feature 2300 that is used to engineer the data switching networks by using data from existing databases. The objective is to transfer an entire switching network from one hardware configuration to another. The use will have to select the type of switching network signaling being used, the global switch modules, the new point code locations, and trunk equipment numbers. SEES will transfer the data from one hardware platform to another while reconfiguring the network to its new environment.

The user starts from the engineering/create database feature. After selecting the netwk_config feature 2300, the user will use the dialing plan and network engineering features. Data is engineered from the office data administration tool data elements directly into the selected "base&control" or database. The user is then required to input the target database 2302. Call init office routine 2304 checks for an existing target database and queries the user as to whether that database should be removed or whether new data will be added to the existing database. If new data is added, the existing database remains unchanged.

The computer program calls the display variables (dis_vars) routine 2306 to set and display selected variables such as lab, office data administration tool version. The program does this task by using the env_menu routine to select the data from preexisting databases. Once found, this data is engineered into the target database. The program then returns to the netwk_config feature 2300 to obtain a list of special network data elements from the selected source database or "base&control." Only those data elements with containing data are shown as a selection.

The network configuration feature 2300 shows all the data elements block 2308 from the source database and allows the user to select the individual data elements manually. This task is accomplished from a menu type screen with each form dynamically identified and selected by a number.

The program copies or dumps the user selected data elements into the target database or "base&control." All data elements are error checked prior to the execution of the dump or copy. If the operation is an append to an existing database, then SEES dumps to an existing form. The formxfer routine is then called.

The evlchg routine 2310 takes one argument and the argument passed is the filename of the script that will be used to make the data changes when the evolve tool is executed. SEES then calls the evl_form routine 2312. The evl_form routine 2312 takes two arguments. The first argument passed is the office data administration tool form name and the second argument is the filename where the contents of the office data administration tool form was dumped. This routine will check to see if there is a possible office data administration tool evolve to go between the two required generics and will perform all necessary step evolves to accomplish the tasks.

The data elements block 2308 proceeds to the formxfer block 2314. The formxfer block 2314 uses the dfixfer block 2316 to calculate the new trunk members in accordance with the new network or lab configuration form user assigned EN's. It will also differentiate between ENTRK1s, Ns, Trunk equipment numbers, etc. and treat them differently. If it is not, then ENTRK1 PASS is set to 1 so that the correct line in mkscript gets written to the SEDL script and conversely this also occurs for TRK1. This dynamically writes an evolve script, if a pathway exists, manipulating the data. The dfixfer block 2316 also checks for FIELDTYPE to determine if the last line to the SEDL script should be written. The program returns to netwk_config after the evolve/transfer is completed.

The ss7_xfer routine 2318 calculates the new global switch modules and pointcodes in accordance with the new network or lab configuration from the user assigned information. Other options exist such as ss7 type parameters and link data elements. The ck_psu routine 2320 will check all available resources on the PSU's for room to support the transitioned links. SEES then returns the user to netwk_config after the evolve/transfer is completed. The user is then prompted as to whether the user wants to exit 2322 or return to the main menu.

FIG. 13 illustrates the process of engineering a new hardware equipment configuration database or data resource from at least one source database or source data resource. The user calls and starts 2400 the computer program. The computer program can be located on one machine (a computer device) or multiple machines virtually connected via a network file share capability allowing all the virtual machines to appear as one machine and containing all existing source databases or source data resources. In the main menu of the computer program, a text or graphical user interface presents the main menu to the user allowing the user to select whether to browse existing source databases and source data resources or whether the user desires to create a new source database or engineer (modify) an existing source database from all or parts of other existing source databases or source data resources.

When the user selects the network configuration engineering feature, the user is required to select the location of the new network configuration database 2402. Selecting means selecting an item from a menu or imputing information such that the computer can react to the instruction. In addition, the user must select whether the new or modified network configuration database should be located on the same machine (computer) or a virtual machine (computer), should the network configuration database be created or modified, and whether the network configuration database should be inclusively updated. The location of the new database 2402 is confirmed 2404 with the user and if the confirmation is not correct, the computer program allows the user to reselect a different location 2402.

The computer program searches or checks the node or location where the user intends for the new or modified network configuration database to be located. This node check will confirm the actual location of the network configuration database, and whether the node is free 2406 on the desired machine (computer). The computer program confirms whether the selected location of the new database is empty of existing data 2406. If the response from the user is yes, the computer program creates a new network configuration directory structure 2408. If the response is no, the program allows the user to delete the existing database 2410. If the database is deleted, the program removes the database structure 2412 and creates a new network configuration directory structure 2408. The network configuration directory structure can be created to hold similar and dissimilar size data as compared to the source databases.

If the existing database structure is not deleted, or the program created a new network configuration directory structure, the computer program then allows the user to select the qualifying source databases available for use 2414. The source databases might have access utilities to assist in the configuration of a new database. The computer program then selects qualifying existing source data resources using the user set criteria input when the user was prompted to select the lab, machine (computer), site, customer name, and software release. The computer program requires the user to select and input certain elements regarding the characteristics desired in the new network configuration database to be created in order to search existing source databases and source data resources for existing data. For example, the user will be prompted to select the lab, the computer or machine, the site location of the new or modified network configuration database, the customer name, the software release, and the version of the source database or source data resource.

The computer program instructs the user to select the source databases from the qualifying source databases 2416. The user identifies the global point code equipment to be used in the new database 2418 and identify the global point codes in the source databases 2420.

The computer program queries the user as to whether the global point codes have enough resources for the new network configuration 2422. If the user responds yes, the computer program queries whether a best fit of the data can be accomplished 2424. If the response is yes, the computer program converts the global point code values to the new values 2426. If the computer program can not perform a best fit of the data, the program allows the user to manually configure 2428 the data and creates an index file 2430 for pointers prior to converting the global point codes to the new values 2426. If the response to the first query 2422, is no, the program allows the user to manually configure 2432 the data and then converts the global point codes to the new values 2426.

The user identifies the new locations 2434 for office point codes, signaling links, destination point codes, packet switching equipment numbers, facility locations, and time slots. The data structure is copied into memory 2436 and the data is converted from a binary format to an ASCII format 2440. The ASCII formatted data is placed into memory 2438 and the computer program extracts the data from memory 2442. After extraction, the computer program selects the specific sets of elements for the new database 2444. The program determines if this format is the same version or release as the new database structure 2446. This is accomplished by matching the selected criteria in the software release with the new or existing software release of the directory structure and name. If the format is not the same, the computer program determines if evolutionary pathways exist 2448. If the evolutionary pathways do not exist, the computer program aborts 2450. Evolutionary pathways are well known in the art. If the evolutionary pathways exist 2448, the program calls an evolution tool 2452, to modify the saved data so that consistency with the new location is maintained.

If the format is the same version or release as the new database structure 2446, or after the evolution of data has occurred 2452, the data is error checked 2454. The program dynamically manipulates and modifies the data 2455. All selected network configuration data that is saved is loaded 2456 or merged into a new or existing network configuration data resource using a platform utility that converts the data from an ASCII format to a binary format and loads the data into the database. The computer program displays 2458 all the statistics on the data elements as they are being loaded into the selected location. In addition, the computer program displays errors, updates, non-updates to the selected location data resource. The computer program then allows the user to return to the main menu or quit, (exit the program) 2460.

Please note that while the specification in this invention has been described in relation to certain preferred embodiments, it will be apparent to those skilled in the art that the invention is capable of alternative embodiments and that certain embodiments described in this invention can be varied considerably without departing from the basic scope and principles of the invention.

What is claimed is:

1. A process for configuring a telephony management system that includes a GSM wireless database, the process comprising the steps of:

querying a plurality of source databases of the telephony management system for a predetermined plurality of data structures that are linked through one or more routines that rely on one or more tools located on a data build machine;

selecting the predetermined plurality of data structures;

modifying a subset of the predetermined plurality of data structures based on at least one preselected criterion;

inserting the subset of the predetermined plurality of data structures into the telephony management system;

wherein the step of selecting the predetermined plurality of data structures comprises the steps of:

selecting the predetermined plurality of data structures to comprise a first predetermined data structure that comprises feature information;

selecting the predetermined plurality of data structures to comprise a second predetermined data structure that comprises dialing information;

selecting the predetermined plurality of data structures to comprise a third predetermined data structure that comprises platform information;

wherein the plurality of source databases comprises a first source database, a second source database, and a third source database, wherein the first source database is different from the second source database, wherein the first source database and the second source database comprise different types of information, wherein the first source database is different from the third source database, wherein the second source database is different from the third source database;

wherein the step of querying the plurality of source databases of the telephony management system for the predetermined plurality of data structures that are linked through the one or more routines that rely on the one or more tools located on the data build machine comprises the steps of:

querying the first source database for the first predetermined data structure that comprises the feature information;

querying the second source database for the second predetermined data structure that comprises the dialing information;

querying the third source database for the third predetermined data structure that comprises the platform information.

2. The process of claim 1, wherein the step of modifying the subset of the predetermined plurality of data structures based on the at least one preselected criterion and the step of inserting the subset of the predetermined plurality of data structures into the telephony management system comprise the step of copying GSM wireless based data from a data structure of a source database of the plurality of source databases to a similarly sized data structure in a new database of the telephony management system.

3. The process of claim 1, wherein the step of modifying the subset of the predetermined plurality of data structures based on the at least one preselected criterion and the step of inserting the subset of the predetermined plurality of data structures into the telephony management system comprise the step of copying GSM wireless data from a data structure of a source database of the plurality of source databases to a dissimilarly sized data structure in a new database of the telephony management system.

4. The process of claim 1, wherein the step of querying the plurality of source databases of the telephony management system for the predetermined plurality of data structures and the step of selecting the predetermined plurality of data structures comprise the step of selecting the predetermined plurality of data structures to comprise subscriber identity confidentiality data.

5. The process of claim 1, wherein the step of querying the plurality of source databases of the telephony management system for the predetermined plurality of data structures and the step of selecting the predetermined plurality of data structures comprise the step of selecting the predetermined plurality of data structures to comprise subscriber identity authentication data.

6. The process of claim 1, wherein the step of querying the plurality of source databases of the telephony management system for the predetermined plurality of data structures and the step of selecting the predetermined plurality of data structures comprise the step of selecting the predetermined plurality of data structures to comprise signaling information data.

7. The process of claim 1, wherein the step of querying the plurality of source databases of the telephony management system for the predetermined plurality of data structures and the step of selecting the predetermined plurality of data structures comprise the step of selecting the predetermined plurality of data structures to comprise voice encoding confidentiality data.

8. The process of claim 1, wherein the step of querying the plurality of source databases of the telephony management system for the predetermined plurality of data structures and the step of selecting the predetermined plurality of data structures comprise the step of selecting the predetermined plurality of data structures to comprise subscriber equipment validation data.

9. The process of claim 1, wherein the step of querying the plurality of source databases of the telephony management system for the predetermined plurality of data structures and the step of selecting the predetermined plurality of data structures comprise the step of selecting the predetermined plurality of data structures to comprise subscriber location data.

10. The process of claim 9, wherein the step of selecting the predetermined plurality of data structures to comprise the subscriber location data comprises the step of selecting the subscriber location data to comprise initial registration data.

11. The process of claim 9, wherein the step of selecting the predetermined plurality of data structures to comprise the subscriber location data comprises the step of selecting the subscriber location data to comprise location update registration data.

12. The process of claim 1, wherein the step of inserting the subset of the predetermined plurality of data structures into the telephony management system comprises the step of creating a new database.

13. The process of claim 1, wherein the step of inserting the subset of the predetermined plurality of data structures into the telephony database management system comprises the step of updating a preexisting database.

14. The process of claim 1, wherein the step of selecting the predetermined plurality of data structures to comprise the first predetermined data structure that comprises the feature information comprises the step of:
  selecting the predetermined plurality of data structures to comprise a first predetermined data structure that comprises rate and routing information;
  wherein the step of selecting the predetermined plurality of data structures to comprise the second predetermined data structure that comprises the dialing information comprises the step of:
    selecting the predetermined plurality of data structures to comprise a second predetermined data structure that comprises a first portion of switch module configuration information and networking rate and routing information;
  wherein the step of selecting the predetermined plurality of data structures to comprise the third predetermined data structure that comprises the platform information comprises the step of:
    selecting the predetermined plurality of data structures to comprise a third predetermined data structure that comprises a second portion of the switch module configuration information that is different from the first portion of the switch module configuration information;
  wherein the step of querying the first source database for the first predetermined data structure that comprises the feature information comprises the step of:
    querying the first source database for the first predetermined data structure that comprises the rate and routing information;
  wherein the step of querying the second source database for the second predetermined data structure that comprises the dialing information comprises the step of:
    querying the second source database for the second predetermined data structure that comprises the first portion of the switch module configuration information and the networking rate and routing information;
  wherein the step of querying the third source database for the third predetermined data structure that comprises the platform information comprises the step of:
    querying the third source database for the third predetermined data structure that comprises the second portion of the switch module configuration information.

15. A process for configuring a telephony management system that includes a GSM wireless database, the process comprising the steps of:
  querying a plurality of source databases of the telephony management system for a predetermined plurality of data structures that are linked through one or more routines that rely on one or more tools located on a data build machine;
  selecting the predetermined plurality of data structures;
  selecting a configuration type for a home location register of the telephony management system;
  modifying a subset of the predetermined plurality of data structures based on at least one preselected criterion; and
  inserting the subset of the predetermined plurality of data structures into the telephony management system
  wherein the step of selecting the predetermined plurality of data structures comprises the steps of:
    selecting the predetermined plurality of data structures to comprise a first predetermined data structure that comprises feature information;
    selecting the predetermined plurality of data structures to comprise a second predetermined data structure that comprises dialing information;
    selecting the predetermined plurality of data structures to comprise a third predetermined data structure that comprises platform information;
  wherein the plurality of source databases comprises a first source database, a second source database, and a third source database, wherein the first source database is different from the second source database, wherein the first source database and the second source database comprise different types of information, wherein the first source database is different from the third source database, wherein the second source database is different from the third source database;
  wherein the step of querying the plurality of source databases of the telephony management system for the predetermined plurality of data structures that are linked through the one or more routines that rely on the one or more tools located on the data build machine comprises the steps of:
    querying the first source database for the first predetermined data structure that comprises the feature information;

querying the second source database for the second predetermined data structure that comprises the dialing information;

querying the third source database for the third predetermined data structure that comprises the platform information.

16. The process of claim 15, wherein the step of selecting the configuration type for the home location register of the telephony management system comprises the step of selecting the home location register to comprise integrated data.

17. The process of claim 15, wherein the step of selecting the configuration type for the home location register of the telephony management system comprises the step of selecting the home location register to comprise stand alone data.

18. The process of claim 15, wherein the step of selecting the configuration type for the home location register of the telephony management system comprises the step of determining a "C" interface.

19. The process of claim 18, wherein the step of selecting the configuration type for the home location register of the telephony management system comprises the step of building a database for the home location register.

20. The process of claim 19, wherein the step of modifying the subset of the predetermined plurality of data structures based on the at least one preselected criterion and the step of inserting the subset of the predetermined plurality of data structures into the telephony management system comprise the step of building signaling connection control part data for a new database of the telephony management system.

21. The process of claim 15, wherein the step of modifying the subset of the predetermined plurality of data structures based on the at least one preselected criterion and the step of inserting the subset of the predetermined plurality of data structures into the telephony management system comprise the step of determining whether mobile switching center data is included in a new database of the telephony management system.

22. The process of claim 21, wherein the step of modifying the subset of the predetermined plurality of data structures based on the at least one preselected criterion and the step of inserting the subset of the predetermined plurality of data structures into the telephony management system comprise the step of including the mobile switching center data in the new database.

23. The process of claim 22, wherein the step of modifying the subset of the predetermined plurality of data structures based on the at least one preselected criterion and the step of inserting the subset of the predetermined plurality of data structures into the telephony management system comprise the step of building visitor location register data in the new database.

24. The process of claim 22, wherein the step of modifying the subset of the predetermined plurality of data structures based on the at least one preselected criterion and the step of inserting the subset of the predetermined plurality of data structures into the telephony management system comprise the step of building equipment identity register data in the new database.

25. The process of claim 22, wherein the step of modifying the subset of the predetermined plurality of data structures based on the at least one preselected criterion and the step of inserting the subset of the predetermined plurality of data structures into the telephony management system comprise the step of determining "A" interface data in the new database.

26. The process of claim 22, wherein the step of modifying the subset of the predetermined plurality of data structures based on the at least one preselected criterion and the step of inserting the subset of the predetermined plurality of data structures into the telephony management system comprise the step of determining base station interfaces data in the new database.

27. The process of claim 22, wherein the step of modifying the subset of the predetermined plurality of data structures based on the at least one preselected criterion and the step of inserting the subset of the predetermined plurality of data structures into the telephony management system comprise the step of determining location areas data in the new database.

28. The process of claim 22, wherein the step of modifying the subset of the predetermined plurality of data structures based on the at least one preselected criterion and the step of inserting the subset of the predetermined plurality of data structures into the telephony management system comprise the step of determining geographic location interfaces data in the new database.

29. The process of claim 22, wherein the step of modifying the subset of the predetermined plurality of data structures based on the at least one preselected criterion and the step of inserting the subset of the predetermined plurality of data structures into the telephony management system comprise the step of determining short message service data in the new database.

30. The process of claim 22, wherein the step of modifying the subset of the predetermined plurality of data structures based on the at least one preselected criterion and the step of inserting the subset of the predetermined plurality of data structures into the telephony management system comprise the step of building dialed digit strings in the new database.

31. The process of claim 22, wherein the step of modifying the subset of the predetermined plurality of data structures based on the at least one preselected criterion and the step of inserting the subset of the predetermined plurality of data structures into the telephony management system comprise the step of building call routing data in the new database.

32. The process of claim 22, wherein the step of modifying the subset of the predetermined plurality of data structures based on the at least one preselected criterion and the step of inserting the subset of the predetermined plurality of data structures into the telephony management system comprise the step of building billing data in the new database.

33. The process of claim 22, wherein the step of modifying the subset of the predetermined plurality of data structures based on the at least one preselected criterion and the step of inserting the subset of the predetermined plurality of data structures into the telephony management system comprise the step of building signaling connection control part data for the new database.

34. The process of claim 15, wherein the step of inserting the subset of the predetermined plurality of data structures into the telephony management system comprises the step of creating a new database.

35. The process of claim 15, wherein the step of inserting the subset of the predetermined plurality of data structures into the telephony database management system comprises the step of updating a preexisting database.

36. The process of claim 15, wherein the step of selecting the predetermined plurality of data structures to comprise the first predetermined data structure that comprises the feature information comprises the step of:

selecting the predetermined plurality of data structures to comprise a first predetermined data structure that comprises rate and routing information;

wherein the step of selecting the predetermined plurality of data structures to comprise the second predetermined data structure that comprises the dialing information comprises the step of:
  selecting the predetermined plurality of data structures to comprise a second predetermined data structure that comprises a first portion of switch module configuration information and networking rate and routing information;
wherein the step of selecting the predetermined plurality of data structures to comprise the third predetermined data structure that comprises the platform information comprises the step of:
  selecting the predetermined plurality of data structures to comprise a third predetermined data structure that comprises a second portion of the switch module configuration information that is different from the first portion of the switch module configuration information;
wherein the step of querying the first source database for the first predetermined data structure that comprises the feature information comprises the step of:
  querying the first source database for the first predetermined data structure that comprises the rate and routing information;
wherein the step of querying the second source database for the second predetermined data structure that comprises the dialing information comprises the step of:
  querying the second source database for the second predetermined data structure that comprises the first portion of the switch module configuration information and the networking rate and routing information;
wherein the step of querying the third source database for the third predetermined data structure that comprises the platform information comprises the step of:
  querying the third source database for the third predetermined data structure that comprises the second portion of the switch module configuration information.

* * * * *